United States Patent
Faurie

(10) Patent No.: US 10,802,531 B2
(45) Date of Patent: Oct. 13, 2020

(54) ROTARY ACTUATOR

(71) Applicant: SIEMENS AKTIENGESELLSCHAFT, Munich (DE)

(72) Inventor: Jean Jacques Faurie, Nuremberg (DE)

(73) Assignee: Siemens Aktiekgesellschaft, Munich (DE)

( * ) Notice: Subject to any disclaimer, the term of this patent is extended or adjusted under 35 U.S.C. 154(b) by 0 days.

(21) Appl. No.: 15/537,230

(22) PCT Filed: Nov. 26, 2015

(86) PCT No.: PCT/EP2015/077724
§ 371 (c)(1),
(2) Date: Jun. 16, 2017

(87) PCT Pub. No.: WO2016/096360
PCT Pub. Date: Jun. 23, 2016

(65) Prior Publication Data
US 2018/0267568 A1   Sep. 20, 2018

(30) Foreign Application Priority Data

Dec. 19, 2014   (DE) .................. 10 2014 226 618

(51) Int. Cl.
*G05G 5/06* (2006.01)
*G05G 5/05* (2006.01)
(Continued)

(52) U.S. Cl.
CPC .............. *G05G 5/06* (2013.01); *G05G 1/105* (2013.01); *G05G 5/05* (2013.01);
(Continued)

(58) Field of Classification Search
CPC ............ G05G 5/06; G05G 5/05; G05G 1/105; H01H 19/6355; H01H 19/635; H01H 19/025
See application file for complete search history.

(56) References Cited

U.S. PATENT DOCUMENTS 3,142,187 A * 7/1964 Kane .................. H01H 19/6355
200/16 A
3,596,013 A * 7/1971 Pihl ........................ H01H 19/11
200/1 R
(Continued)

FOREIGN PATENT DOCUMENTS

CN   2713613 Y   7/2005
DE   2337135 A1   2/1974
(Continued)

OTHER PUBLICATIONS

EPO Translation of the Description of DE 10048380 A1, Beraud, dated Apr. 12, 2001. (Year: 2019).*

*Primary Examiner* — Daniel D Yabut
(74) *Attorney, Agent, or Firm* — Henry M. Feiereisen LLC

(57) ABSTRACT

A rotary actuator includes a cylindrical main body, an actuating handle placed on the cylindrical main body and having a display area, a crown, and an inserted base which is arranged in the cylindrical main body and has contours which engage in contours of the crown. The rotary actuator further includes a guide element for guiding the inserted base and the crown.

5 Claims, 2 Drawing Sheets

(51) Int. Cl.
*G05G 1/10* (2006.01)
*H01H 19/635* (2006.01)
*H01H 3/42* (2006.01)
*H01H 19/36* (2006.01)
*H01H 19/00* (2006.01)
*H01H 19/02* (2006.01)
*F21V 8/00* (2006.01)

(52) U.S. Cl.
CPC ....... H01H 19/6355 (2013.01); *G02B 6/0001* (2013.01); *H01H 3/42* (2013.01); *H01H 19/025* (2013.01); *H01H 19/36* (2013.01); *H01H 2019/008* (2013.01)

(56) References Cited

U.S. PATENT DOCUMENTS

| | | | | |
|---|---|---|---|---|
| 3,770,926 A * | 11/1973 | Wanner | ............. | H01H 19/6355 200/325 |
| 3,848,219 A * | 11/1974 | Oka | .............. | H01C 10/00 338/119 |
| 4,044,214 A | 8/1977 | Rayburn et al. | | |
| 4,175,221 A * | 11/1979 | Kellogg | .............. | H01H 19/03 200/16 A |
| 4,227,056 A * | 10/1980 | Johnston | .............. | H01H 9/285 200/43.11 |
| 4,542,366 A * | 9/1985 | Oyama | .............. | H01C 10/14 338/119 |
| 4,551,587 A * | 11/1985 | Rose | .............. | H01H 19/585 200/11 R |
| 6,274,835 B1 | 8/2001 | Mo | | |
| 6,670,567 B1 * | 12/2003 | Koseki | .............. | H01H 19/005 200/17 R |
| 2006/0209518 A1 | 9/2006 | Nishimoto et al. | | |
| 2007/0289856 A1 * | 12/2007 | Horton | .............. | H01H 19/11 200/327 |

FOREIGN PATENT DOCUMENTS

| | | | | |
|---|---|---|---|---|
| DE | 10048380 A1 * | 4/2001 | ........... | H01H 19/563 |
| DE | 10048380 A1 | 4/2001 | | |
| EP | 1109181 A2 | 6/2001 | | |
| EP | 2051270 A1 | 4/2009 | | |
| EP | 2811500 A1 | 12/2014 | | |

* cited by examiner

ROTARY ACTUATOR

CROSS-REFERENCES TO RELATED APPLICATIONS

This application is the U.S. National Stage of International Application No. PCT/EP20151077724, filed Nov. 26, 2015, which designated the United States and has been published as International Publication No. WO 2016/096360 A1 which claims the priority of German Patent Application, Serial No. 102014226618.1, filed Dec. 19, 2014, pursuant to 35 U.S.C. 119(a)-(d).

BACKGROUND OF THE INVENTION

The invention relates to a rotary actuator having a cylindrical main body and an actuating handle which is fitted onto the cylindrical main body and has a display area.

Such rotary actuators are generally used to input commands at so-called machine/human interfaces. In this context, it is conceivable to use rotary actuators not only for switching control currents but also for power switching operations in that the rotary actuator is used as a trigger for power switches. Stringent requirements in terms of service life, robustness, seal of the electrical part against water and dirt are made of these rotary actuators. Furthermore, they are to be able to be manufactured with the highest possible level of cost effectiveness and processing reliability.

These command devices are used in switchboards, operator control panels, switching cabinet doors or housing lids. Command devices are generally of modular design. This means that they are composed of an actuator, an attachment part, such as for example an annular nut or a mounting securing element, and one or more switching elements which are embodied as normally closed or normally open switching elements. For the purpose of mounting, the actuator is generally guided from the front through a hole in the switchboard and mounted from the rear by means of an attachment part. The switching elements are attached mechanically to the actuator or to the attachment part with screws, snap-action hooks or bolts. The electrical connection of the switching elements to the controller is carried out via terminal clamps.

In particular with rotary actuators there can be a problem that the mechanical transmission chain of the rotational actuation is disrupted starting from the actuating handle, and as a result the defined latching position and therefore switching position is not reached but, owing to incorrect mechanical transmission, only an intermediate position is reached which does not correspond to the desired switching position state.

SUMMARY OF THE INVENTION

Accordingly, the object of the present invention consists in providing a rotary actuator which permits a reliable transmission of a switching position over a long service life.

The object is achieved in accordance with the invention by a rotary actuator having a cylindrical main body and an actuating handle which is fitted onto the cylindrical main body and has a display area. The invention is distinguished here by the fact that an inserted base is arranged in the cylindrical main body, wherein the inserted base has contours which engage in contours of a crown, and wherein the inserted base and the crown are guided on a guide element.

Advantageous embodiments and developments which can be used individually or in combination with one another are the subject matter of the dependent claims.

The essence of the invention consists in the fact that the mechanical transmission chain starting from the actuating handle has been optimized by using a guide element, in particular a lightguide, wherein the guide element serves simultaneously as a guide for the inserted base and the crown which ensure the change in the switching position into a defined latched position. In order to implement the different switching positions, contours, which do not engage one in the other in the non-actuated state, are formed both on the inserted base and on the crown. The contours may be embodied, for example, in the form of projections and recesses. In the actuated state, the crown then shifts through 45° with respect to the inserted base, which is held in a positionally stable fashion in the cylindrical base body of the rotary actuator by latching hooks. In this position, the contours of the inserted base and of the crown no longer engage one in the other but are instead arranged offset by 45° with respect to one another. During the actuation of the actuating handle, the crown is guided by the guide element, in particular the lightguide, which is formed in the actuating handle between the inserted base and the display area and is secured to the actuating handle. In the case of actuation, the guide element carries along the crown, which is therefore guided by the guide element.

In one specific refinement of the invention there may be provision that the guide element is a lightguide. In this particular embodiment, the guide element is configured in an advantageously functionally optimized fashion.

In one development of this concept according to the invention, it may be provided that the contours of the inserted base and of the crown which engage one in the other are embodied in such a way that different latching positions and therefore different switching positions of the actuating handle can be implemented. In this context, the first latching position in the non-actuated state is distinguished by the fact that the contours which are formed on the inserted base and on the crown engage one in the other, for example by virtue of the fact that they are embodied as recesses and projections. In the second latching position in the actuated state, the contours on the inserted base and on the crown are arranged offset through 45° with respect to one another, and therefore no longer engage one in the other.

In one specific refinement of the invention, a further concept can consist in the fact that a spring element is arranged between the crown and the guide element. In this context, the guide element is guided by the spring element. The spring element is formed between the crown and the actuating handle and permits resetting of the actuating handle.

In one particularly advantageous refinement of the invention there may be provision that the guide element is formed between the inserted base and the display area. The formation of the guide element up to the display area permits the rotational actuation to be transmitted directly to the guide element.

In one specific refinement of the invention, a further concept can consist in the fact that the guide element is secured to the actuating handle. The securement of the guide element to the actuating handle permits a direct transmission of movement from the actuating handle to the crown, which can thereby assume a defined latching position.

In one development of this concept according to the invention there may be provision that the inserted base and the crown each have a cylindrical main body. The cylindrical base shapes of the inserted base and crown bring about a situation in which said inserted base and crown are also guided through the inner wall of the cylindrical main body of the rotary actuator.

In one specific refinement of the invention, a further concept can consist in the fact that latching hooks are formed on the inserted base and ensure a positionally stable orientation in the cylindrical main body of the rotary actuator. There is provision here that the latching hooks latch into contours on the inner surface of the cylindrical main body of the rotary actuator, with the result that when the handle is actuated the inserted base is always supported in a positionally stable fashion with respect to the crown.

In one specific refinement of the invention, a further concept can consist in the fact that in the event of actuation with latching of the actuating handle the crown and the guide element assume a position with respect to the positionally stable inserted base which is offset by 45°. This position which is offset by 45° corresponds to the second switching position. The rotary actuator according to the invention has a cylindrical main body with an actuating handle which is fitted onto the cylindrical main body and has a display area which can preferably be illuminated. The actuating handle is mounted rotatably in the cylindrical main body of the rotary actuator here. Positioned in the cylindrical main body of the rotary actuator is an inserted base which engages through latching hooks in corresponding contours of the inner face of the cylindrical main body of the rotary actuator and as a result is installed in a positionally stable fashion. The inserted base engages with its contours in corresponding contours of a crown. A guide element, in particular a lightguide, which is guided through the crown which is preferably embodied in a cylindrical fashion, is arranged between the inserted base and the actuating handle. A spring element, which permits resetting of the actuating handle, is arranged between the crown and the guide element. The guide element, preferably the lightguide, is secured to the actuating handle and carries along the crown in the event of actuation, with the result that the crown including the guide element changes to a position which is offset by 45° with respect to the inserted base. In this switching position, the contours on the inserted base no longer engage in the corresponding contours of the crown.

The rotary actuator according to the invention is distinguished by the fact that the mechanical transmission chain starting from the actuating handle has been optimized by using a guide element, in particular a lightguide, wherein the guide element serves simultaneously as a guide for the inserted base and for the crown, which inserted base and crown ensure the change in the switching position to a defined latching position. This avoids undefined intermediate positions. The small amount of play between the components results in relatively high robustness and an associated relatively long service life of the rotary actuator. In addition, a better switching sensation is achieved by virtue of the compact and stable functional unit composed of the inserted base, crown and guide element.

BRIEF DESCRIPTION OF THE DRAWINGS

Further advantages and embodiments of the invention are explained below on the basis of an exemplary embodiment and with reference to the drawing, in which, in each case in a schematic form.

DETAILED DESCRIPTION OF THE EMBODIMENTS

Figure 1:
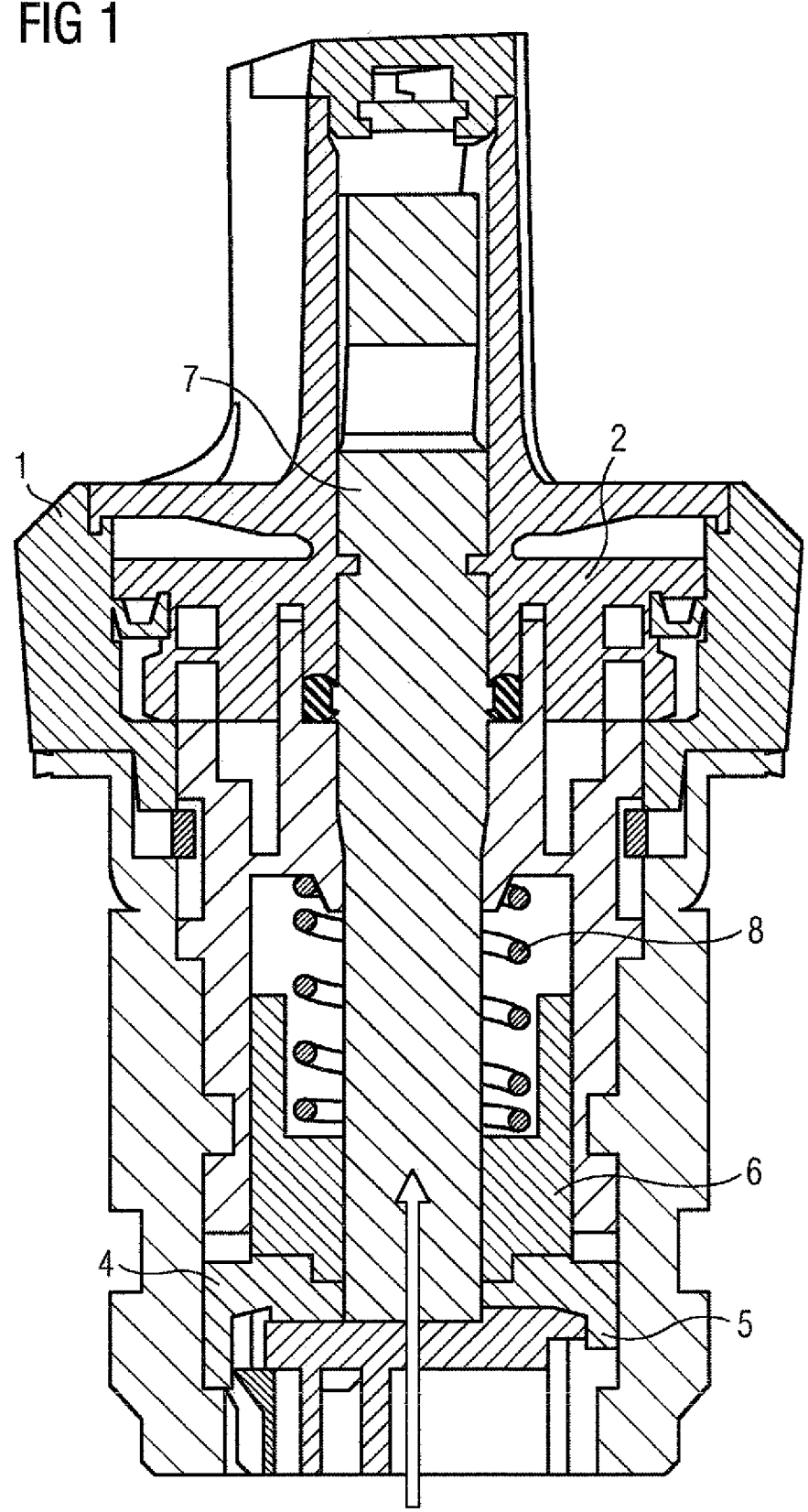
FIG. 1 shows a sectional illustration of an exemplary embodiment of a rotary actuator according to the invention.

FIG. 1 shows a rotary actuator according to the invention having a cylindrical main body 1 and an actuating handle 2 which is fitted onto the cylindrical main body 1 and has a display area which can preferable be illuminated. The actuating handle 2 is mounted here in a rotatable fashion in the cylindrical main body 1 of the rotary actuator. An inserted base 4, which engages by means of latching hooks 5 in corresponding contours of the inner surface of the cylindrical main body 1 of the rotary actuator and is as a result installed in a positionally stable fashion is positioned in the cylindrical main body 1 of the rotary actuator. The inserted base 4 engages with its contours in corresponding contours of a crown 6. A guide element 7, in particular a lightguide, which is guided by the crown 6 which is preferably embodied in a cylindrical fashion is arranged between the inserted base 4 and actuating handle 2. A spring element 8, which permits resetting of the actuating handle 2 is arranged between the crown 6 and guide element 7. The guide element 7, preferably the lightguide, is secured to the actuating handle 2 and in the case of actuation carries along the crown 6, with the result that the crown 6 including the guide element 7 changes to a position which is offset by 45° with respect to the inserted base 4. In this switching position, the contours on the inserted base 4 no longer engage in the corresponding contours of the crown 6.

The spring element is partially housed in the rotatable crown and partially housed in a linking member, as illustrated in FIG. 1. The rotatable crown directly contacts an inner wall of the linking member and the inserted base directly contacts an inner wall of the cylindrical main body, as illustrated in FIG. 1.

Figure 2:
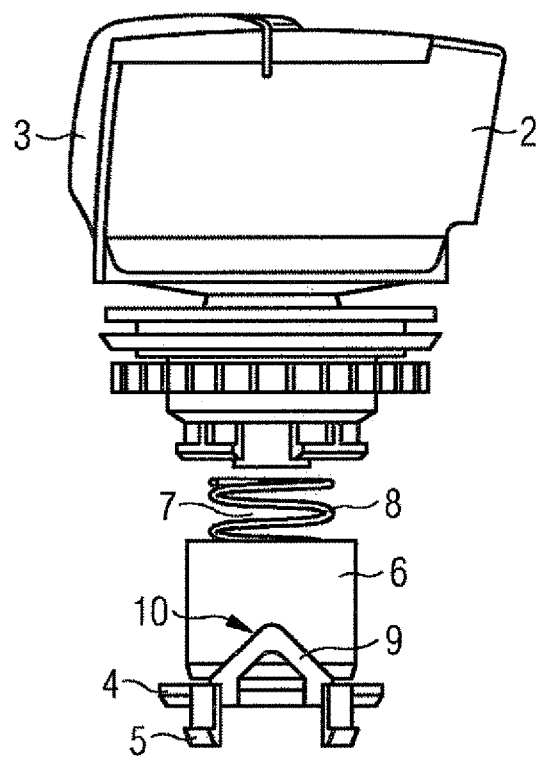
FIG. 2 shows a perspective illustration of the functional unit composed of the actuating handle, inserted base, crown and guide element of the rotary actuator in the non-actuated state.

FIG. 2 illustrates the functional unit composed of the actuating handle 2, inserted base 4, crown 6 and guide element 7 of the rotary actuator with a display 3 which can preferably be illuminated, in the non-actuated state. In the non-actuated state, the contours 9 of the inserted base 4, which can for example be embodied as a projection, engage in the contours 10 of the crown 6, which contours 10 can correspondingly be embodied as recesses. However, it is also conceivable that the contours 10 on the crown 6 are embodied as projections and the corresponding contours 9 on the inserted base 4 are embodied as recesses.

Figure 3:
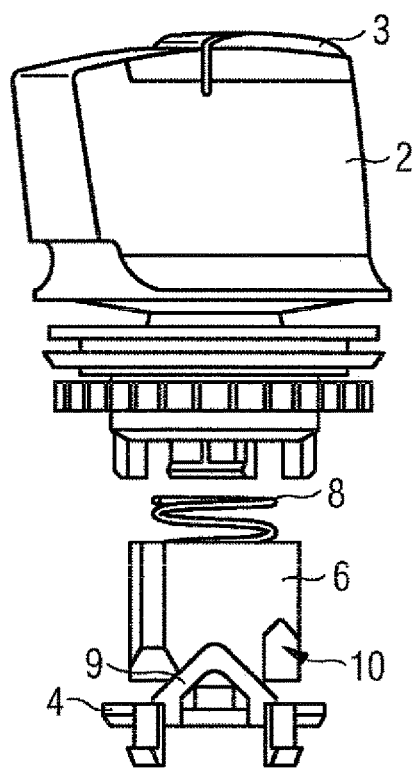
FIG. 3 shows a perspective illustration of the functional unit composed of the actuating handle, inserted base, crown and guide element of the rotary actuator in the actuated state.

FIG. 3 shows the functional unit composed of the actuating handle 2, inserted base 4, crown 6 and guide element 7 of the rotatory actuator in the actuated state. In this switching position the contours 9 of the inserted base 4, which can for example be embodied as a projection, do not engage in the contours 10 of the crown 6, which contours 10 are correspondingly embodied as recesses. In this switching position, the crown 6, including the guide element 7, is then arranged offset by 45° with respect to the inserted base 4.

The rotary actuator according to the invention is distinguished by the fact that the mechanical transmission chain starting from the actuating handle has been optimized by using a guide element, in particular a lightguide, wherein the guide element serves simultaneously as a guide for the inserted base and the crown, which inserted base and crown ensure the change in the switching position to a defined latching position. This avoids undefined intermediate positions. The small amount of play between the components results in relatively high robustness and an associated relatively long service life of the rotary actuator. In addition, a better switching sensation is achieved by virtue of the compact and stable functional unit composed of the inserted base, crown and guide element.

The invention claimed is:

1. A rotary actuator, comprising:
    an entirely cylindrical main body;
    an actuating handle mounted in a rotatable fashion in the cylindrical main body and fitted onto the cylindrical main body and having a display area;
    a rotatable crown;
    an inserted base arranged in the cylindrical main body, said inserted base having contours which engage in contours of the crown;
    a guide element separate from the actuating handle and configured to guide the inserted base and the crown; and
    a spring element arranged between the rotatable crown and the guide element to permit resetting of the actuating handle, said spring element partially housed in the rotatable crown and partially housed inside a linking member,
    wherein the rotatable crown is arranged between the inserted base and the actuating handle, wherein the guide element is a lightguide,
    wherein the rotatable crown and the guide element assume a position offset by 45° with respect to the inserted base upon actuation with latching of the actuating handle, so that the contours of the inserted base do not engage with the rotatable crown,
    wherein the inserted base and the rotatable crown are each cylindrical and are guided through an inner wall of the cylindrical main body, and the rotatable crown directly contacts an inner wall of the linking member and the inserted base directly contacts an inner wall of the cylindrical main body.

2. The rotary actuator of claim 1, wherein the contours of the inserted base and the rotatable crown are configured to enable different latching positions and different switching positions of the actuating handle.

3. The rotary actuator of claim 1, wherein the guide element is formed between the inserted base end the display area.

4. The rotary actuator of claim 1, wherein the guide element is secured to the actuating handle.

5. The rotary actuator of claim 1, further comprising latching hooks formed on the inserted base to ensure a positionally stable orientation in the cylindrical main body.

* * * * *